Jan. 20, 1942.   R. C. STOLTE   2,270,482
CLUTCH BAFFLE PLATE
Filed Nov. 30, 1939

Inventor
Richard C. Stolte
By Blackmore, Spencer & Hieb
Attorneys

Patented Jan. 20, 1942

2,270,482

UNITED STATES PATENT OFFICE 2,270,482

CLUTCH BAFFLE PLATE

Richard C. Stolte, Lansing, Mich., assignor to General Motors Corporation, Detroit, Mich., a corporation of Delaware Application November 30, 1939, Serial No. 306,938

9 Claims. (Cl. 192—68)

This invention relates to clutches and concerns means to prevent oil from reaching the driven plate. In the past when baffles have been used for this purpose, they have been made of metal and have tended to transmit engine noises.

It is an object of this invention to prevent oil from reaching the driven plate by means which shall not transmit noise.

Figure 1:
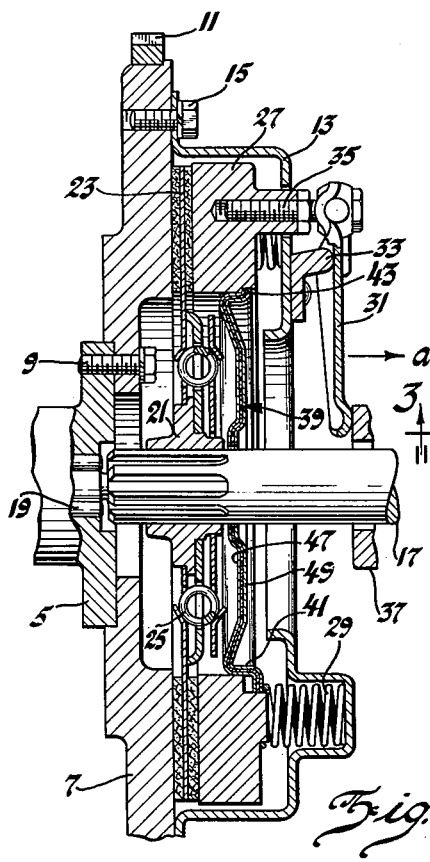
Figure 1 is a transverse section through a clutch embodying the engine.
Figure 2:
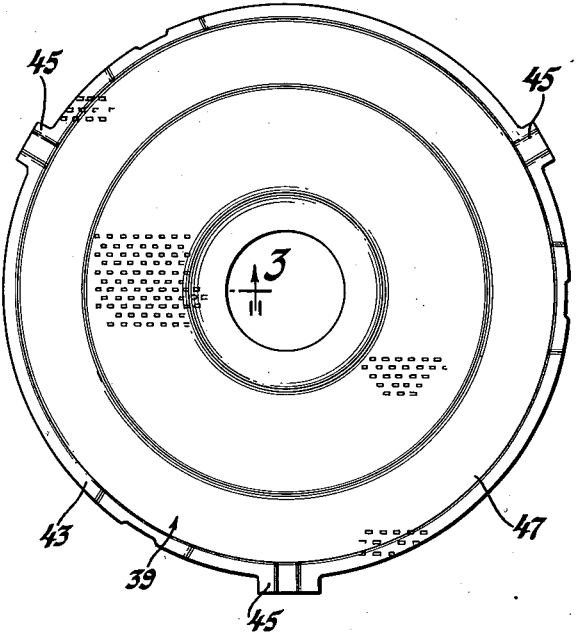
Figure 2 is a plane view of the novel baffle plate.

The engine shaft 5 is secured to the flywheel 7 by bolts 9. Numeral 11 is the ring gear which is adapted to be engaged by the pinion of the starting motor. A cover and spring abutment marked 13 is shown. It is secured to the flywheel at 15. The transmission shaft 17 enters the enclosure formed by the flywheel and the cover and its end is piloted within the engine shaft where an anti-friction bearing 19 is provided. The driven shaft carries a hub 21 operably connected to a driven clutch plate member 23 by means of torque transmitting springs 25.

A pressure plate 27 is guided by the cover for axial reciprocation. It moves to grip the driven plate under the influence of suitable spring means 29. It is released by the rotation of levers, one of which is seen at 31. The levers are fulcrumed on the cover at 33 and are operably connected to suitable members 35 carried by the pressure plate. The levers are rocked by movement of a ring 37 which may be actuated by suitable mechanical devices connected with the clutch pedal not shown.

Figure 3:
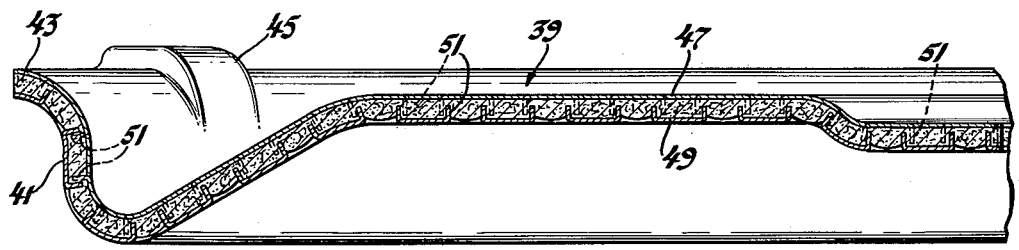
Figure 3 is a section on line 3—3 of Figure 2.

Under the influence of the rotation of the parts described above there tends to be a flow of air through the clutch in the direction of the arrow a. In the absence of anything to prevent it, this flow of air may develop a suction condition within the clutch enclosure to the left of the driven plate (Figure 1). Oil in the form of mist may be drawn through the region where the flywheel is in contact with the flange of the engine shaft. It is the purpose of this invention to check this admission of oil. A baffle plate is identified as a whole by numeral 39. The baffle plate takes the form of a disc with a central opening of such size as to accommodate shaft 17. At its margin it is shaped as at 41 to extend axially along and to snugly fit the inner wall of pressure plate 27. It terminates in a short circular radial extension 43 which engages in a groove in the pressure plate. At a plurality of positions the extension 43 is elongated and channeled as at 45 to engage coacting formations on the pressure plate whereby the disk may rotate jointly with the pressure plate. Preferably, and as shown, the springs 29 serve also to hold the baffle on the pressure plate, the ends of at least some of said springs engaging both the projecting lug formations on the pressure plate and the elongated radial extensions of the baffle. Such a baffle serves to block the air flow and to prevent oil from reaching the driven plate. Such a baffle, however, if made solely of sheet metal, serves to transmit engine noises and is for this reason objectionable. To avoid the transmission of noise the baffle is made of metal associated with a suitable sound deadening material such as asbestos. Preferably there are two layers of metal marked 47 and 49 in Figure 3. Between them is a layer of asbestos. There are tongues 51 punched out from the metal laminae, these tongues extending into the asbestos to lock it to the metal layers. By this expedient the oil is kept from the driven plate and the result is obtained without the transmission of noise.

I claim:

1. In a friction clutch, in combination with a pressure plate, a cover plate and springs engaged between said plates at points spaced circumferentially thereof, whereby to urge said plates relatively away from one another, a baffle plate disposed between said pressure plate and said cover plate, said baffle plate having peripheral portions engaged between one of said plates and said spring and being thereby supported, said baffle plate including said peripheral portion being formed of a laminated material comprising outer sheets of thin sheet metal and a layer of sound deadening material sandwiched between said sheets.

2. In a clutch mechanism for driving and driven members, a relatively heavy ring-like pressure member radially spaced from and axially movable with respect to said driven member, means yieldably urging said pressure member in one direction of its axial movement, abutment means for said yieldable means, a clutch disc mounted on said driven member and extending radially therefrom, said disc having a portion thereof disposed between said driving member and said pressure member, and a closure member extending radially between said driven member and said pressure member, said closure member being disposed axially between said clutch plate and said abutment means and adjacent the face of said pressure member opposite said clutch disc, and being constructed of a laminated material comprising sheets of thin sheet metal and a layer of sound-deadening material sandwiched between said sheets.

3. In a friction clutch, in combination with a driven member an annular pressure plate forming with said member an annular opening and circumferentially spaced springs engaged against said pressure plate for moving the same in clutch engaging direction, a baffle plate traversing the opening in said pressure plate for intercepting oil moving toward said opening, said baffle plate being formed of a laminated material comprising outer sheets of thin sheet metal and a layer of sound-deadening material sandwiched between said sheets, and means on the periphery of said plate interposed between said springs and the pressure plate so as to support the baffle plate.

4. In a friction clutch, in combination with an annular pressure plate, a cover plate and springs engaged against said pressure plate, a baffle plate traversing the opening in said pressure plate, said baffle plate having on its periphery radially extending ears engaged between said springs and said pressure plate so as to support said baffle plate, said baffle plate including said ears being formed of a laminated material comprising sheets of thin sheet metal and a layer of sound deadening material sandwiched between said sheets.

5. In a friction clutch, in combination with an annular pressure plate and springs engaged against lugs on said pressure plate for moving said pressure plate in clutch engaging direction, a baffle plate traversing the opening in the pressure plate to intercept oil moving toward said opening, said baffle plate having on its periphery radially extending ears indented to partially receive some of said lugs and engaged between said springs and said lugs so as to locate and support said baffle plate in fixed relation to said pressure plate, said baffle plate and said ears being uniformly constructed of a laminated material comprising sheets of thin sheet metal and a layer of sound deadening material sandwiched between said sheets.

6. A friction clutch as defined in claim 4, wherein said sheets are perforated to provide a multitude of tiny lugs pressed into said sound deadening material.

7. In a clutch, a driven shaft, an annular pressure plate surrounding said shaft and radially spaced therefrom, yielding means to move said pressure plate axially to clutch engaging position, a baffle supported solely at its outer marginal region at the inner edge of the pressure plate, the inner edge of said baffle being free and closely surrounding said shaft, said baffle being formed from contiguous layers of metal and fibrous material.

8. In a clutch, a driven shaft, an annular pressure plate surrounding said shaft and radially spaced therefrom, yielding means to move said pressure plate axially to clutch engaging position, a baffle supported solely at its outer marginal region at the inner edge of the pressure plate, the inner edge of said baffle being free and closely surrounding said shaft, said baffle being formed from spaced metal layers with an interposed layer of fibrous material.

9. In a clutch, a driven shaft, an annular pressure plate surrounding said shaft and radially spaced therefrom, yielding means to move said pressure plate axially to clutch engaging position, a baffle supported solely at its outer marginal region at the inner edge of the pressure plate, the inner edge of said baffle being free and closely surrounding said shaft, said baffle being formed from spaced metal layers and an intermediate layer of asbestos, said metal layers having tongues each directed toward the opposite metal layer and operable to lock the asbestos and metal layers together.

RICHARD C. STOLTE.